Feb. 6, 1962   H. TROEGER   3,019,659
CENTRIFUGAL GOVERNOR HAVING AXIALLY-ALIGNED WEIGHTS
Filed Aug. 31, 1959
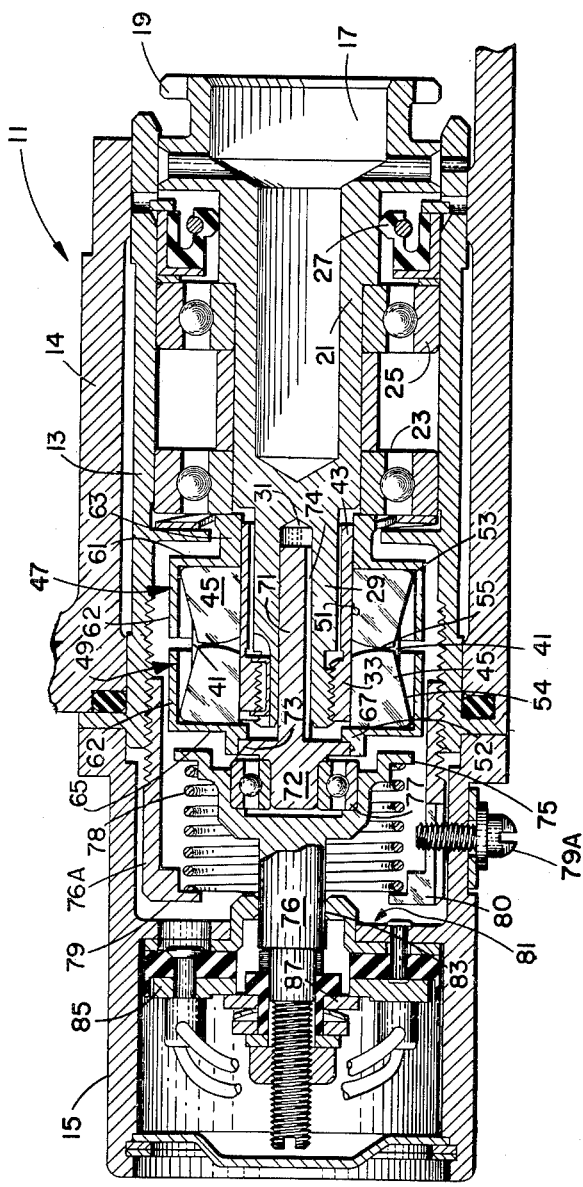
INVENTOR.
HENRY TROEGER
BY Robert W. Ely United States Patent Office 3,019,659
Patented Feb. 6, 1962

3,019,659
CENTRIFUGAL GOVERNOR HAVING AXIALLY-ALIGNED WEIGHTS
Henry Troeger, Cooperstown, N.Y., assignor to The Bendix Corporation, a corporation of Delaware
Filed Aug. 31, 1959, Ser. No. 836,972
5 Claims. (Cl. 73—551)

This invention relates to speed-responsive governors and more particularly to governors having a centrifugally-actuated mechanism which axially operates an electrical switch or other control device.

An object of the present invention is to provide an improved centrifugal governor which gives reliable operation at a predetermined speed.

A further object is to provide such a governor in which pairs of axially-aligned centrifugally-actuated elements are pivoted outwardly with axial camming action about pivot points which do not require mounting pins.

Another object is to provide an improved governor which has a plurality of pairs of centrifugal weights mounted in slots and adapted to pivot outwardly on facing rolling cam surfaces to give axial movement against a spring-biased operating plunger.

An additional object is the provision of such an improved governor which is compact and is economical to manufacture and to assemble.

The realization of the above objects along with the features and advantages of the present invention will be apparent from the following description of the preferred embodiment of the invention and the accompanying drawing.

In the drawing, a cross-sectional longitudinal showing of the speed governor is presented and the view shows plate-like flyweights having contacting rolling surfaces pivotally-mounted in retainer cups and arranged to impart axial movement to a spring-biased plunger having an electrical switch contact.

Referring to the drawing, the tubular governor housing means 11 includes a tubular housing sleeve 13 within support housing 14 at the shaft end and a tubular element 15 at the control end of the housing. A driven shaft 17 having a gear 19 for connection to the gearing of an aircraft turbine starter (not shown) extends axially into the sleeve 13. A large diameter section 21 of shaft 17 is rotatably mounted by inner bearing 23 and outer bearing 25 carried by sleeve 13. A seal 27 is provided outwardly of bearing 25. The driven shaft 17 has small diameter axial extension 29 extending inwardly toward the control end. Extension 29 has an axial bore 31 and carries an annular ring 33 which is threaded and locked on the extension 39 for rotation therewith. Ring 33 has a plurality of relatively-narrow equi-spaced radial slots 41 cut lengthwise (two opposed slots appearing) and a tubular projection 43 extending along shaft extension 29 toward bearing 23.

In each slot 41, two identical axially-aligned centrifugal weights 45 are slidably mounted and oppositely oriented. The pairs of plate-like weights 45 are confined in the slots 41 by means of an axially-fixed retainer cup 47 and a movable retainer cup 49 axially spaced from ring 33 by the weights. Each weight 45 has a flat bottom or inner side 51 contacting the bottom of the slot 41, a radial transverse side 52 contacting the adjacent retainer cup, a rounded pivot corner 53 in the corner of the adjacent retainer cup, an inclined wall 54 which slopes radially inwardly toward the center of the slots, and a rolling cam surface side 55 which extends between bottom side 51 and inclined side 54. Bottom side 51 is perpendicular to radial side 52 to provide a right-angle corner while at the radial side 52 to provide a right-angle corner while at the rounded pivot corner 53 at the juncture of sides 52 and 54 an acute-angle corner is formed. The curved cam surface 55 is the arc of a radius from about the mid-point of radial side 52. Thus, a line normal to the point of tangency falls midway between the pivot corner 53 and the bottom side 51. Radially-extending rolling cam surfaces are thus provided which give rolling action through the full travel of the weights 45. With this construction, it is apparent that centrifugal forces will roll the four-sided weights 45 outwardly with camming action and result in axial movement of the movable retainer cup 49. It is to be noted that the left weights 45 project axially from the slots 41 so that the movable retainer cup 49 does not abut ring 33 and so that the facing rolling surfaces 55 are maintained in contact by the urging of the movable retainer cup 49 toward ring 33. With this construction, the weights 45 are normally pivoted inwardly about corners 53 until limited by inner bottom sides 51 abutting the bottom of the slots 41, since the movable cup 49 is urged to the right by a spring force as will be hereinafter described.

The axially-fixed retainer cup 47 has a radial wall 61 which abuts the shaft end of the ring 33 and an axial wall 62 which overhangs the radially-outer surface of the shaft end of the ring 33. Cup 47 also has a neck 63 which is mounted on ring projection 43 and which abuts and positions the radially-inner part of bearing 23. The movable retainer cup 49 complements cup 47 by having a radial wall 65 which faces the control end of ring 33 and abuts the axially-projecting radial sides of weights 45 and by having an axial wall 66 which overhangs the radial-outer surface of the control end of the ring 33. The corners of both cups 47 and 49 at the juncture of the axial and radial walls provide pivot bearings for the weights and the axial walls 62 and 66 limit the outward movement of the weights 45. Radial wall 65 has a groove 67 at its radially inner end for connection to the actuating pin 71.

The axial bore 31 of driven shaft 17 slidably receives the actuating pin 71 which has a mounting head 72. Head 72 includes a flange 73 which connects to the inner end of the radial wall 65 of cup 49. Pin 71 has a vent flat 74 which extends to the bottom of the bore 31. The flared end 75 of the axial operating plunger 76 surrounds the mounting head 72 and bearing 77 extends between the head 72 and flared end 75 to provide for support and rotation of the pin 71. An adjustment sleeve 76A is threaded in housing sleeve 13 and has an inwardly projecting flange 79 which provides support for tensioning coil spring 78. Spring 78 extends axially between flange 79 and the flared end 75 of the operating plunger 76 and urges the non-rotating plunger 76, pin 71 and movable cup 49 to the right against the weights 45 and toward the driven shaft 17 so that rotation of pin 71 and cup 49 with the shaft results. This tensioning also holds the weights 45 pivoted inwardly until a predetermined speed when centrifugal force will overcome the reaction of the spring at the pivot corners. Screw 79A and slots 80 in sleeve 76A provide for locking sleeve 76A.

A support structure 81 having an axial opening 83 for the operating plunger 76 is connected to the control housing element 15 and together with bearing 77 supports plunger 76. Support structure 81 also has an annular electric contact 85 which normally abuts the contact 87 carried by the plunger 76 to provide a centrifugally-operated switch. Separation of the contacts will break an electric circuit and can be used to stop the supply of motive fluid to a starter turbine having a connection to gear 19 at a predetermined speed.

In operation, the gear 19 is rotated by a device which is to be controlled at a predetermined speed, such as an air turbine starter which has its air supply cut off by a solenoid valve at engine starting speed. Gear 19 drives shaft 17 and its rotation is imparted to the rotatable structure associated with the shaft 17. This structure is to the right of bearing 77 which isolates the plunger 76 restrained by spring 78 from rotation with the shaft. Thus, the actuating pin 71, movable retainer cup 49, slotted ring 33, weights 45 and axially-fixed retainer cup 47 are rotated with shaft 17. At a predetermined speed dependent upon the relation between spring 78 and weights 45, the centrifugal forces on weights 45 will be such that the weights 45 pivot or roll outward on the facing rolling cam surfaces 55 providing axial camming action. During this radially-outward pivoting about rounded pivot corners 53 mounted in the bearing corners of the retainer cups 47 and 49, the movable retainer cup 49 will be moved axially to the left due to the configuration of the rolling surfaces 55 as related to the pivot points and since the right cup 47 is fixed axially. Movement of cup 49 axially moves actuating pin 71 and through bearing 77 operating plunger 76 so that the plunger contact 87 is axially-separated from the contact 85 mounted in flange 81 to cause de-energization of a solenoid valve for the purpose above described. The outward pivoting of weights 45 is limited by the inclined sides abutting the axial walls of the retainer cups. During rotation of ring 33 below the predetermined speed, it is to be noted that the left or control-end weights 45 are urged against the right or shaft-end weights and both are inwardly pivoted as shown on the drawing due to spring 78. This spring 78 exerts a rightward axial force on non-rotating plunger 76 and on rotating actuating pin 71 through bearing 77. Pin 71 in turn urges the movable cup 49 against the radial sides 52 of the left weights 45 which project from slots 41 so that the weights are pivoted inwardly.

After the governor has operated at the predetermined speed and shaft 17 is no longer driven, the weights 45 under the urging of spring 78 will be pivoted inwardly by rolling cam surfaces 55 and pivot corners 53. This inwardly pivoting results in the return to the positioning as shown on the drawing with plunger 76, pin 71 and cup 49 moved back to the right and with contact 87 abutting contact 85. Inward pivoting is limited by the axial sides 51 of weights 45 abutting the bottom of the slots 41.

From the foregoing, it is apparent that an arrangement has been provided which does not have weights mounted on pivot pins and which is economical to manufacture and assemble. Further, reliable operation at a predetermined speed results from rolling cam action and resulting axial movement.

It is to be understood that persons skilled in the art can make changes in the disclosed embodiment without departing from the invention as defined by the appended claims.

What is claimed is:

1. A centrifugal governor comprised of a driven shaft having gear for connection to device to be controlled at a predetermined speed, an annular ring having a plurality of equi-spaced radial slots mounted on said shaft for rotation therewith, a pair of identical centrifugal plate-like weights axially aligned and slidably received in each of said slots, each of said weights having a rolling cam surface and a pivot corner, each pair of said weights being arranged so that said cam surfaces are in contact and one of said weights projects axially from one end of said ring, said contacting cam surfaces being free of interlocking structure, retaining means carried by said shaft and arranged so that said weights can pivot outwardly to a limited extent, said retaining means including axially-movable actuating structure contacting the axially-projecting weights, spring means connected to said actuating structure arranged to exert an axial force so that said cam surfaces are in contact, said weights being constructed so that at a predetermined speed said weights pivot outwardly by means of said cam surfaces and pivot corners to cause said actuating structure to be moved axially against the force of said spring means, said weights and said retaining means being constructed so that below said predetermined speed said weights are pivoted inwardly and said actuating structure is moved axially toward said weights under the urging of said spring means.

2. A centrifugal governor comprised of a tubular housing, a driven shaft extending into said housing and having gear for connection to device to be controlled at a predetermined speed, an annular ring having a plurality of equi-spaced radial slots mounted on said shaft for rotation therewith, a pair of identical centrifugal plate-like weights slidably received in each of said slots, each of said weights having a rolling cam surface and a pivot corner, each pair of said weights being arranged so that said cam surfaces are in contact and being pivoted inwardly, said contacting cam surfaces being free of interlocking structure, one of each pair of said weights projecting axially from one end of said ring, retaining means carried by said shaft and arranged to position said weights so that said weights can pivot outwardly to a limited extent, said retaining means including axially-movable actuating structure contacting the axially-projecting weights, axially-movable operating means connected to said actuating structure by a bearing so that said operating means is isolated from rotation, said housing having inwardly projecting flange, a coil spring extending axially between said flange and said operating means, said weights being constructed so that at a predetermined speed said weights pivot outwardly by means of said cam surfaces and pivot corners to cause said actuating structure and said operating means to be moved axially against the force of said spring.

3. A centrifugal governor comprised of a tubular housing, a driven shaft extending into said housing and having gear for connection to device to be controlled at a predetermined speed, an annular ring having a plurality of equi-spaced radial slots mounted on said shaft for rotation therewith, a pair of identical centrifugal plate-like weights slidably received in each of said slots, each of said weights having a rolling cam surface and a pivot corner, said contacting cam surfaces being free of interlocking structure, each pair of said weights being arranged so that said cam surfaces are in contact and being pivoted inwardly, one of each pair of said weights projecting axially from one end of said ring, retaining means carried by said shaft and arranged to position said weights so that said weights can pivot outwardly to a limited extent, said retaining means having an axially-fixed radial wall abutting the other end of said ring and including axially-movable actuating structure contacting said axially-projecting weights at said one end of said ring, spring-biased axially-movable operating means supported by said housing and connected to said actuating structure by a bearing so that said operating means is isolated from rotation, said weights being constructed so that at a predetermined speed said weights pivot outwardly by means of said cam surfaces and pivot corners to cause said actuating structure and said operating means to be moved axially against the spring force of said spring-biased operating means, each of said weights having an inclined side extending between said pivot corner and the radially-outer end of said rolling cam surface, said retaining means including pivot corners for each of said weights and axial walls overhanging the inclined sides of said weights.

4. A centrifugal governor comprised of a driven shaft having an annular ring which has a shaft end and a control end, said ring having a plurality of equi-spaced radial slots, a pair of identical four-sided plate-like weights slidably received and oppositely oriented in said slots, each of said weights having an inner axially-extending bottom side abutting the bottom of the receiving slot and a radially-extending side at the ends of said slots, said pairs of weights having radially-extending rolling cam sides in facing contacting relation, said contacting cam surfaces being free of interlocking structure, said weights having inclined sides opposite said bottom sides, the inclined sides sloping radially inward from the outer ends of the radial walls, said weights having rounded pivot corners at the juncture of said inclined sides and said radial sides, a first retainer cup having a radial wall facing said shaft end of said ring and having an axial wall overhanging the weights in said shaft end of said ring, a second retainer cup having a radial wall facing the control end of said ring and having an axial wall overhanging the weights in said control end of said ring, said retainer cups providing corner pivot bearings at the juncture of said radial and axial walls for said pivot corners of said weights, said weights in the control end of said ring axially projecting therefrom and abutting the facing radial wall of said second retainer cup, axially-movable control means connected to said second retainer cup, spring means biasing said control means toward said second retainer cup so that said weights are normally pivoted inwardly by said pivot corners and said rolling cam surfaces, said weights being constructed to pivot outwardly at a predetermined speed of said driven shaft to overcome said spring means and axially move said control means, the outward pivoting of said weights being limited by said inclined sides contacting said axial walls of said retainer cups.

5. A centrifugal governor comprised of tubular housing means, a driven shaft having a gear and extending axially into said housing means, said shaft having a large diameter support section and a small diameter axial extension, two axially-spaced bearings rotatably mounting said shaft in said housing means at said support section, an annular ring having a shaft end and a control end mounted on said extension for rotation therewith, said ring having a tubular projection extending toward said shaft support section, an axially-fixed retainer cup having a radial wall abutting the shaft end of said ring and having an axial wall overhanging the radially-outer surface of the shaft end of said ring, said fixed cup having a neck mounted on said tubular projection and extending from the radial wall of said fixed cup to the adjacent radial-inner part of the inner one of said bearings, a movable retainer cup having a radial wall facing the control end of said annular ring and having an axial wall overhanging the radial-outer surface of the control end of said annular ring, said radial and axial walls providing pivot corner bearings at the juncture thereof, said annular ring having equi-spaced radial slots, a pair of identical centrifugal plate-like weights slidably-mounted in each of said slots and being oppositely oriented, each of said weights having an inner side abutting the bottom of said slots and an end radial side abutting the radial wall of the adjacent retainer cup, each pair of said weights having rolling cam surface extending radially outward from the bottom of the slot and said surfaces being in contact, said contacting cam surfaces being free of interlocking structure, said weights having inclined sides opposite said inner sides facing respectively said axial walls of said retainer cups, said inclined sides respectively sloping inwardly toward the center of said slots, said weights having rounded pivot corners received in said pivot corner bearings, the weights at the control end of said ring axially projecting from said ring and axially spacing said movable retainer cup from said ring, said shaft axial extension having an axial bore, an actuating pin having a mounting head slidably received in said bore, said movable retainer cup being connected to said mounting head of said actuating pin, an axial operating plunger having a flared end surrounding said mounting head, said pin mounting head being rotatably supported in said flared end for rotation relative to said flared end, said housing having an inwardly projecting annular flange, a coil spring extending between said flange and said flared end so that said movable retainer cup is urged toward said fixed retainer cup and said weights are pivoted inwardly, said housing means including support structure having an axial opening receiving and supporting said operating plunger, said rolling surfaces and pivot corners of said weights being constructed to pivot said weights outwardly against the force of said coil spring at a predetermined speed of said shaft and to provide axial movement to said operating plunger, said inclined sides of said weights and said axial walls of said retainer cups limiting the outward pivoting of said weights.

References Cited in the file of this patent

UNITED STATES PATENTS

| | | |
|---|---|---|
| 173,069 | Shapley | Feb. 1, 1876 |
| 2,096,741 | Fried | Oct. 26, 1937 |
| 2,561,560 | Brown | July 24, 1951 |
| 2,612,757 | Teague | Oct. 7, 1952 |
| 2,775,665 | Harstick | Dec. 25, 1956 |